Figure 1:
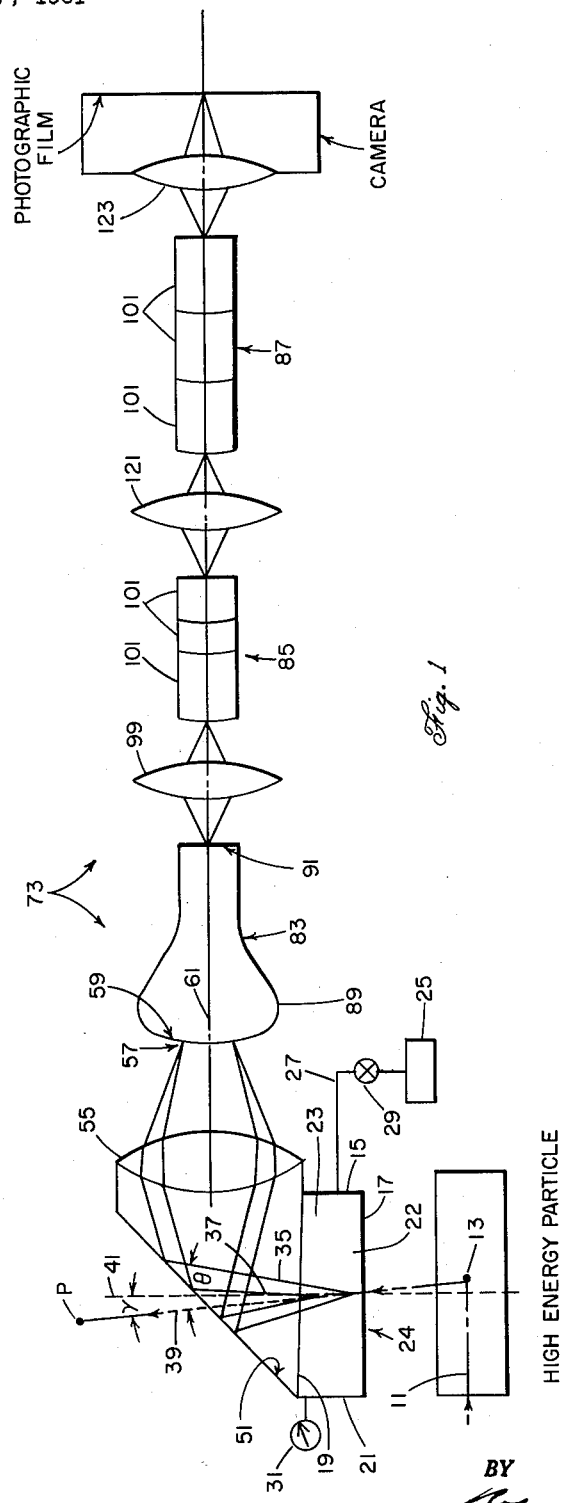

July 7, 1964

A. ROBERTS 3,140,394

MEANS FOR DETERMINING THE DIRECTION AND
VELOCITY OF NUCLEAR PARTICLES

Filed April 7, 1961

4 Sheets-Sheet 1

INVENTOR.
ARTHUR ROBERTS
BY

INVENTOR.
ARTHUR ROBERTS

United States Patent Office 3,140,394
Patented July 7, 1964

3,140,394
MEANS FOR DETERMINING THE DIRECTION AND VELOCITY OF NUCLEAR PARTICLES
Arthur Roberts, Chicago, Ill., assignor to the United States of America as represented by the United States Atomic Energy Commission
Filed Apr. 7, 1961, Ser. No. 101,607
3 Claims. (Cl. 250—71.5)

This invention relates to systems for the study of high-energy nuclear particles and more particularly to systems employing Cerenkov light for the study of high-energy nuclear particles.

Means for determining the existence and properties of particular nuclear particles, including electrons, protons, mesons, anti-protons, and other particles produced in nuclear interactions, have been useful in understanding the basic structure of matter. Properties of interest have included the momenta, velocity and direction of the particles produced. One device that has been useful in these studies has been the Cerenkov detector. In one Cerenkov detector a cylinder having opposite end windows has provided an enclosed chamber with a gas under pressure therein called a Cerenkov radiator. A charged nuclear particle of sufficient velocity has entered one window along the axis of the cylinder in a direction substantially parallel therewith and has passed through the gas so as to produce transient flashes of faint predominantly blue Cerenkov light. The light has been a function of the well-known Cerenkov relation $\cos \Theta = 1/n\beta$ where $n$ corresponds to the refractive index of the gas and $\beta$ corresponds to the velocity of the particle. The light flashes have passed through the opposite end window and a flat mirror disposed at a suitable angle, such as a forty-five degree angle to the axis of the cylinder, has reflected the light away from the particle path and toward a counting device such as a device capable of producing electrical output signals corresponding in number to the number of Cerenkov light flashes produced in the radiator.

In improved devices, the pressure of the gas in the Cerenkov radiator has been selectively increased and decreased to change the index of refraction of the gas. These detectors have usually been of the threshold type in which a particle having a velocity $\beta$ greater than a threshold value given by $\beta = 1/n$ has produced Cerenkov light, and a particle having a velocity $\beta$ below the threshold value has not produced Cerenkov light. The pressure of the gas has thus been changed in these devices to determine the threshold and from that the velocity of particles but the threshold has often been vague. Also, these devices have required time-consuming adjustments and have been cumbersome for determining the velocity of particles over wide velocity ranges. Moreover, they have been limited to prescribed velocity determinations at any one time and have substantially been limited to determinations relating only to particles of a particular direction, for example, the direction of the radiator axis. Increased accuracy is desirable and additionally it is advantageous to determine the incident direction of the particles and to determine the velocity and direction of several discrete particles of the same and different velocities simultaneously.

Because of the nature of the problems involved, it has been difficult sufficiently to improve the devices known heretofore or to achieve the above-mentioned advantages. Even at substantially increased threshold accuracies, it has been difficult or impossible simultaneously to determine the velocity and direction of separate particles having different velocities and the same direction, different velocities and directions or the same velocity and different directions. The Cerenkov light must not only be well defined into a first ring image corresponding in size and position with the particles producing the light but the first image must be intensified by means sensitive to the dominant wavelengths of the light received thereby and capable of producing an intensified image that corresponds identically in size and position with the first image.

It has now been found that the velocity and direction of one or more nuclear particles can be determined when a photo-electronic image intensifier is operated in a Cerenkov detector system so that a well-defined ring of light corresponding in size and location respectively with the particle velocity and direction is produced from the detector and superimposed on an image intensifier sensitive to the dominant wave lengths of the image produced. A variable directional application of the image is applied to the image intensifier and the output of the image intensifier is a variable directional image from which the velocity and direction of one or more of the particles in the Cerenkov radiator are determined.

The above and further novel features of this invention will appear more fully from the following detailed description when the same is read in connection with the accompanying drawings. It is to be expressly understood, however, that the drawings are not intended as a definition of the invention but are for the purpose of illustration only.

Figure 2:
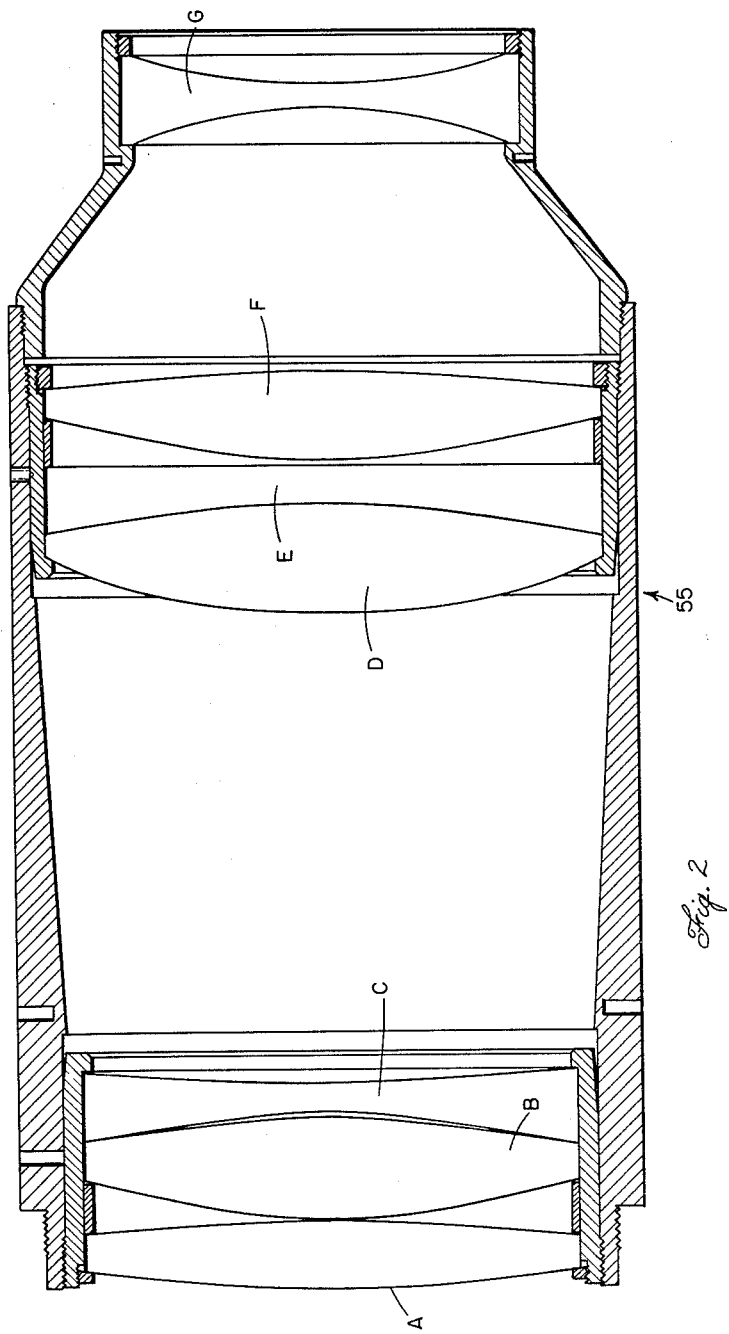
Figure 3:
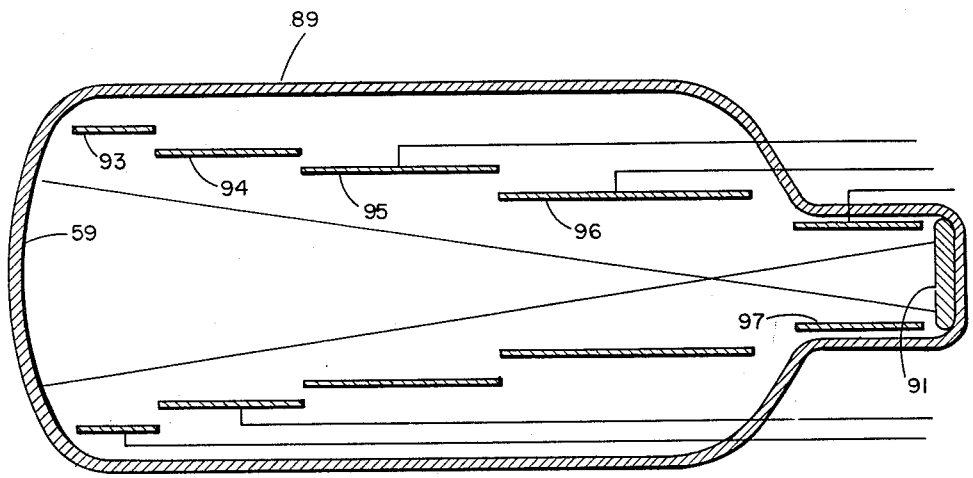
Figure 6:
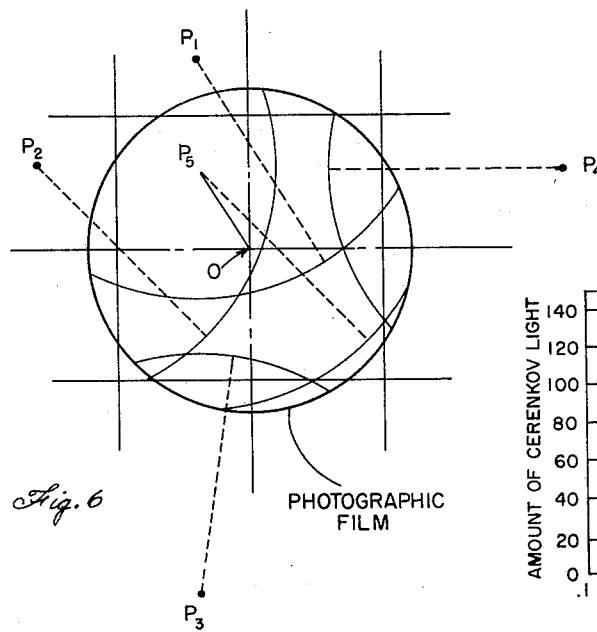
Figure 5:
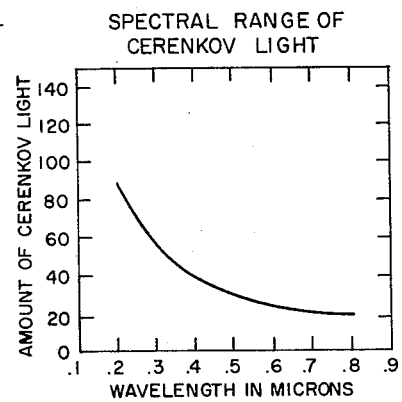
Figure 4:
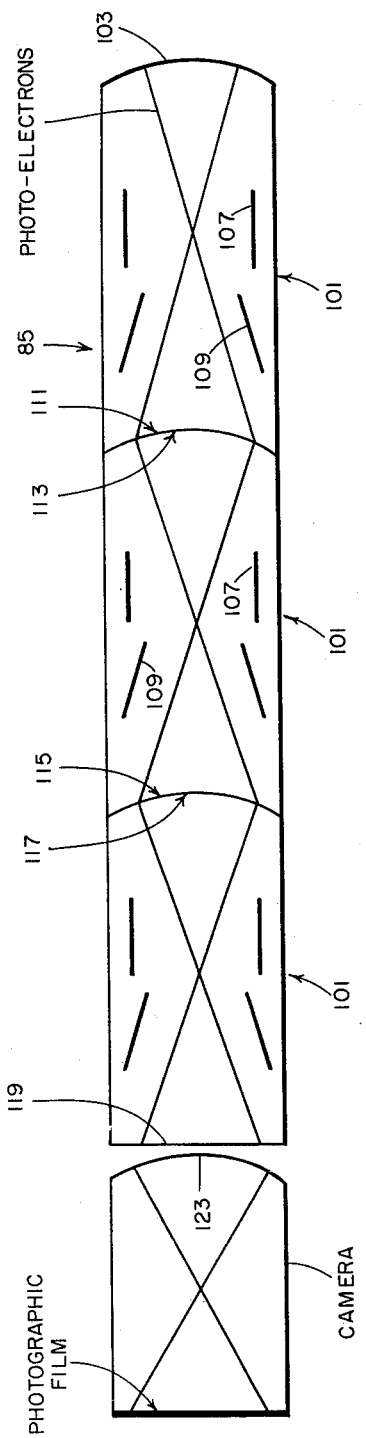

In the drawings where like parts are marked alike:
FIG. 1 is a schematic view of an embodiment of this invention;
FIG. 2 is a detailed view of a lens of FIG. 1;
FIG. 3 is a schematic view of one section of the image-intensifier of FIG. 1;
FIG. 4 is a schematic view of another section of the image intensifier of FIG. 1;
FIG. 5 is a graph of the spectral range of Cerenkov light; and
FIG. 6 is a schematic view of a typical image produced by the image-intensifier of FIG. 1.

Referring now to FIG. 1, a suitable high-energy beam, such as a proton beam 11 directed at target 13, produces high energy charged reaction particles such as electrons, protons, mesons and anti-protons. For ease of explanation, the path of only one reaction particle P is illustrated as traveling in the indicated direction by the arrow associated with the particle P in FIG. 1. The particle, or particles as the case may be, enter chamber 15 through a first window 17 made of transparent material such as glass which together with a second like window 19 and a cylindrical container 21 form the enclosed chamber 15. A suitable gas 23, forming a Cerenkov radiator 24, fills the chamber 15 under pressure by means of a suitable source 25, line 27 and valve 29 connected therewith. Advantageously, the gas is a suitable fluorochemical gas such as the FC–75 brand of fluorochemical gas supplied by the Minnesota Mining and Manufacturing Company. This gas has a relatively low critical pressure for the production of Cerenkov light at reasonably low temperatures. For example, a suitable pressure is about 250 pounds per square inch at 200 degrees centigrade whereas the required pressure of other suitable gases such as carbon dioxide at room temperature are much higher. Adjustment of valve 29 changes the pressure of gas 23 in chamber 15, as indicated by gauge 31, until its refractive index is sufficiently greater than unity such that high energy reaction particles from target 13 having a speed greater than that of light in the gas will produce Cerenkov light in chamber 15.

The particle entering the chamber 15 in the direction indicated by the arrow in FIG. 1 passes through the gas 23 and produces rays of Cerenkov light parallel to the sides of right circular cones, such as cones 35 and 37, having a common axis 39 corresponding to the path of the particle P from target 13. The cone angle $\Theta$ is a function of $n\beta$ as determined from the Cerenkov relation $\cos \Theta = 1/n\beta$, where $n$ corresponds to the refractive index of the gas and $\beta$ corresponds to the velocity of the particle. The angle $\gamma$ is the angle between the path of the particle P from target 13 and an axis 41 such as the axis of cylinder 21.

The particle P passes through window 19 and through a suitable flat mirror 51 made, for example, of silvered glass which is disposed at a suitable angle, such as a forty-five degree angle, to the axis 41. The rays in the cone of Cerenkov light in chamber 15 produced by the particle, pass through the window 19 and the mirror reflects the rays against a lens 55 such as the wide aperture five-inch field, $f/1.5$ relay lens 55 illustrated in FIG. 2. As illustrated, lens 55 is a compound lens comprising appropriate individual sections A, B, C, D, E, F, and G to provide a wide field of view. The lens is adapted to receive the Cerenkov light rays reflected from mirror 51 and to focus them in a ring image 57 on a circular wide focal plane surface having an axis 61 in accordance with well-known principles of optics. The diameter of the ring 57 corresponds to the velocity of the particle P producing the ring such that the higher the velocity of the particle P the larger the diameter of the ring 57 and the lower the velocity of the particle P the smaller the diameter of the ring 57. The position of the ring 57 on the surface 59 corresponds to the direction of the particle P such that if the direction of the particle P corresponds with the direction of axis 41, the center of the ring will coincide with the axis 61 of the surface 59 and the larger the angle $\gamma$ the farther the center of the ring will be from the axis 61. The position of the center of the ring 57 to the right or left or up or down from the axis 61 corresponds to the direction of the particle P to the right or left or up or down from the aixs 41.

In accordance with this invention, the first image produced by lens 55 is intensified by applying the image 57 onto an image intensifying means 73 having at least one photo cathode means having a photo-cathode surface sensitive to the dominant wave lengths of the light received thereby. The photo cathode means produces photo-electrons corresponding to the image imposed thereon and has at least one electrostatic focusing and accelerating means for focusing and accelerating said photo-electrons, a phosphor screen sensitive to said focused and accelerated photo-electrons for producing photons corresponding to said photo-electrons, and means for focusing said photons into an image corresponding in size and position to said first image. Since the image transmitted by lens 55 is faint, the image intensifying means 73 advantageously comprises a first section 83, a second section 85 and a third section 87.

The first section 83 comrpises a large high-vacuum intensifying tube 89 having a five inch photo-cathode surface 59 sensitive to the dominant wave lengths of the light received thereby. Normally, short wave lengths between about .2 and .5 microns as shown in FIG. 5 dominate in the Cerenkov light transmitted by lens 55. It has been found advantageously, therefore, that the photo-cathode tube 89 be a cesium antimony cathode which is highly sensitive to the mentioned wave lengths. The tube 89 has a one inch phosphor output screen 91 and the demagnification factor is about $\frac{1}{5}$. The tube in consequence is large and it has been advantageous to use four separate electrostatic focusing electrodes 93, 94, 95 and 96. These electrodes focus the electrons inside an anode 97 which accelerates the electrons against phosphor screen 91. Thereupon, photons are produced on the back side of the screen 91 which correspond in pattern and position to said photoelectrons and a lens 99 focuses the photons in ring images corresponding in size and position to the ring images transmitted by lens 55. The electrodes and anode are energized from a suitable high voltage source (not shown).

The second section 85 is a multi-stage section having three like high-vacuum image intensifier stages 101 and suitable power sources (not shown). The first intensifier stage comprises a glass window 103 having a photo-cathode surface that is sensitive to the dominant wave lengths of light received thereby. Since the wave lengths are dominated by short wave lengths within the mentioned range received by the first tube 89 the photo-cathode is similar in spectral response to tube 89.

The photo-cathode at window 103, produces photo-electrons corresponding in pattern and position to the photons received thereby. Electrostatic focusing electrodes 107 focus the photo-electrons in anode 109 and the anode accelerates the photo-electron against a phosphor screen 111 integrally formed on the outside of a photo-cathode 113. The phosphor screen 111 produces photons corresponding in pattern and position to the photo-electrons received thereby and the photo-cathode 113 produces corresponding photo-electrons in pattern and position which are focused and accelerated against a phosphor screen 115. This screen 115 is integrally formed with a photo-cathode 117. The phosphor screen 115 produces photons corresponding in pattern and position to the photo-electrons received thereby and the photo-cathode 117 produces a corresponding pattern and position of photo-electrons. These latter photo-electrons strike a phosphor screen 119 and produce photons corresponding in pattern and position to the photo-electrons received thereby. Thereupon, these latter photons are focused by lens 121 into ring images corresponding in size and position to the first ring images transmitted by lens 55.

Lens 121 focuses the ring images transmitted thereby onto the third image intensifying section 87 which is exactly like the second section 85. This section 87 transmits intensified ring images that correspond exactly in size and position to the first ring images transmitted by lens 55. Advantageously, the output from section 87 is focused by a lens 123 and transmitted onto a pohto-sensitive film centered to record the ring images transmitted by lens 123.

The described image intensifier and system are suitable for intensifying the ring images transmitted by lens 55 sufficiently to produce images on photographic films. Tests have shown that the persistence of images focused on the phosphor screens is sufficient to extract 90% of the energy in the stored image. Theoretically, the system of this invention has a gain of as high as 100 in the number of photons in the image on photo-cathode tube 89. Advantageously, the phosphor screen of section 83 is a P–15 phosphor. The following phosphor tubes are tri-alkali cathodes (called S–20 tubes) and have P–11 blue phosphor screens. The mentioned tubes and their phosphors have been found to have sufficient persistence times for purposes of the method and apparatus of this invention, but obviously other tubes and phosphors may be adapted for use therewith so long as they have sufficient spectral sensitivity.

In operation, the system of this invention comprises directing high energy nuclear particles into a Cerenkov radiator so as to produce Cerenkov light, reflecting and focusing the Cerenkov light into ring images corresponding in size and position to the velocity and direction of the particles producing the light, electronically intensifying the brightness of the ring images produced, and recording the intensified images on a photographic film. A photograph is shown in FIG. 6 in which five ring images have been photographed simultaneously. The diameter of the five circles correspond proportionally to the velocity of five discrete particles $P_1$, $P_2$, $P_3$, $P_4$ and $P_5$ traversing the Cerenkov radiator at the same itme. The diameter of the circles is larger as the velocity is larger and smaller as the velocity is less. The centers of the circles are easily determined by simple mechanical drawing instruments and the position of the center of the circles corresponds proportionally to the direction of the particles since the notation O in FIG. 6 corresponds to the axis of the Cerenkov radiator.

This invention has the advantages of determining the velocity and direction of one or more high energy particles at the same time and of determining the velocity and direction of discrete high energy particles over relatively wide ranges.

What is claimed is:

1. Apparatus for determining the velocity and direction of individual, charged, nuclear particles of different velocities and directions, comprising a cylindrical container forming a closed chamber, a gas in said chamber, means for selectively adjusting the pressure of said gas so that said gas has an index of refraction greater than unity, means for introducing said particles into said gas to produce Cerenkov light in said gas having dominant wavelengths from .2 to .5 micron, a mirror for reflecting said Cerenkov light, a lens having a broad field of view for focusing said reflected Cerenkov light into individual ring images of light in the focal plane of said lens, the size and position of said ring images corresponding respectively to the velocity and direction of said individual particles, and image intensifying means having an unobstructed cesium antimony cathode in the focal plane of said lens for receiving said ring images and supplying intensified ring images whose size and position correspond with the velocity and direction of said respective, individual, charged, nuclear particles.

2. Apparatus for determining the velocity and direction of individual, charged, nuclear particles of different velocities and directions, comprising a container forming a closed chamber, first and second means in opposite ends of said container that pass said particles, a gas in said chamber, means for selectively adjusting the pressure of said gas so that said gas has an index of refraction greater than unity, means for introducing said particles into said gas through said first means so as to produce Cerenkov light in said gas including dominant wavelengths from .2 to .5 micron, a mirror adjacent said second means for reflecting the Cerenkov light produced in said container, said mirror also passing said particles, a lens for focusing said Cerenkov light reflected by said mirror into rings of light whose size and position correspond respectively to the velocity and direction of said particles in said container, and image intensifying means having an unobstructed cesium antimony cathode that is sensitive to said dominant wavelengths for producing photo-electrons, means for focusing and accelerating said photo-electrons, phosphor screen means spectrally sensitive to said photo-electrons for storing energy therefrom and supplying photons corresponding thereto, and means for extracting 90% of the stored energy from said screen and supplying ring images whose size and position correspond with the velocity and direction of said charged particles in said container.

3. Apparatus for simultaneously determining the velocity and direction of individual, charged, nuclear, particles of different velocities and directions comprising a container forming a closed chamber, a gas in said chamber, means for selectively adjusting the pressure of said gas so that said gas has an index of refraction greater than unity, means for introducing said particles into said gas to produce Cerenkov light in said gas having dominant wavelengths from .2 to .5 micron, a mirror for reflecting said Cerenkov light, a lens having a broad field of view for focussing said reflected Cerenkov light into individual ring images of light in the focal plane of said lens, the size and position of said ring images corresponding respectively to the velocity and direction of said individual particles, image intensifying means having an unobstructed cesium antimony cathode in the focal plane of said lens that is sensitive to said dominant wavelengths for producing photo-electrons, means for focussing and accelerating said photo-electrons, phosphor screen means spectrally matched and sensitive to said photo-electrons for storing eenrgy therefrom and supplying photons corresponding thereto, and means responsive to said photons for producing photographic images whose size and position correspond respectively with the velocities and directions of said respective individual, charged, nuclear particles.

References Cited in the file of this patent

UNITED STATES PATENTS 3,049,619   Genovese _____ Aug. 14, 1962

OTHER REFERENCES

Cerenkov Radiation, by G. B. Collins et al., from Physical Review, Oct. 1, 1938, vol. 54, pp. 499 to 503.

Amplification of Transient Images in High-Gain Photocathode-Phosphor Image Intensifier Systems, by Arthur Roberts, from the Symposium on Photoelectronic Image Devices of Sept. 3–5, 1958, in Advances in Electronics and Electron Physics, vol. 12, pp. 135 to 152.

Gas Cerenkov Counters, by John H. Atkinson et al., from the Review of Scientific Instruments, October 1959, vol. 30, No. 10, pp. 864 to 868.

A Cerenkov Detector Accurately Measuring Velocity and Direction Over a Wide Range, by Arthur Roberts, Univ. of Rochester, Rochester, New York, NYO–9031, March 25, 1960.

Realizable Light Gain in Photoelectronic Image Intensifiers, by L. Mandel, from Journal of Scientific Instruments, vol. 32, No. 10, October 1955, pp. 405 and 406.